United States Patent [19]

Persidok

[11] 4,016,454
[45] Apr. 5, 1977

[54] THREE LARGE SIGNAL DEFLECTION SYSTEM

[75] Inventor: Jacek Antoni Persidok, Addison, Ill.

[73] Assignee: Motorola, Inc., Schaumburg, Ill.

[22] Filed: May 2, 1975

[21] Appl. No.: 574,065

[52] U.S. Cl. ................................ 315/409; 315/393; 315/395; 315/399

[51] Int. Cl.² ........................................ H01J 29/70

[58] Field of Search ........... 315/393, 395, 399, 409

[56] References Cited

UNITED STATES PATENTS

| 2,644,103 | 12/1951 | Fyler et al. | 315/393 |
| 2,702,874 | 12/1950 | Adler | 315/399 |
| 2,796,552 | 6/1957 | Dietch | 315/393 |
| 2,855,593 | 10/1941 | Gloess | 315/393 |

Primary Examiner—Malcolm F. Hubler
Attorney, Agent, or Firm—Donald B. Southard; Eugene A. Parsons; James W. Gillman

[57] ABSTRACT

The deflection system includes a first pair of deflection coils connected in series for moving the beam of a cathode ray tube in a horizontal direction and a second pair of deflection coils having a choke connected in series therebetween with a first capacitor connected in parallel with the choke and one coil and a second capacitor connected in parallel with the choke and the other coil to linearly add a relatively low and a relatively high frequency deflection signal for moving the beam in steps vertically across the cathode ray tube and linearly in small vertical sawtooths between the steps.

6 Claims, 5 Drawing Figures

THREE LARGE SIGNAL DEFLECTION SYSTEM

BACKGROUND OF THE INVENTION

1. FIELD OF THE INVENTION

In visual monitors, and especially for use with computers and the like, it is often necessary to have the ability to display rows of letters, numbers and other symbols. To provide the ability for these displays it is sometimes convenient to utilize sweep signals other than the normal horizontal and vertical sweep signals utilized in television and the like. For example, three signal deflection systems are used in some monitors because a less expensive logic system is required.

2. DESCRIPTION OF THE PRIOR ART

In prior art structures, a third small signal can sometimes be superimposed, or added to, the relatively large vertical deflection signal with only a small loss of linearity. However, if the third signal being added to the vertical deflection signal is relatively large a substantial nonlinearity occurs in the prior art structures.

Another type of device which might provide the required deflection could be constructed by providing a third set of deflection coils in the yoke. In this fashion the various deflection coils could be matched to the power supplies and there might be no loss of linearity. However, this method of providing the deflection requires a substantial increase in the amount and complexity of the equipment and a resulting increase in the cost.

SUMMARY OF THE INVENTION

The present invention pertains to a three large signal deflection yoke which may be constructed by modifying a standard deflection yoke for a cathode ray tube.

More specifically, the present invention pertains to a deflection system for controlling the position of the electron beam on the face of a cathode ray tube wherein a relatively low frequency deflection system is utilized for moving the beam in substantially equal steps across the face in a predetermined direction and a relatively high frequency deflection signal is utilized for moving the beam linearly in the predetermined direction a distance less than the distance between the equal steps, the system including a pair of deflection coils having an inductance connected in series therebetween with a first capacitor connected in parallel across the inductance and one deflection coil and a second capacitor connected in parallel across the inductance and the other deflection coil so that the deflection coils appear electrically in series for the low frequency deflection signal and electrically in parallel for the high frequency deflection signal.

It is an object of the present invention to provide a new and improved three large signal deflection system.

It is a further object of the present invention to provide a deflection system which enables the use of a power supply of minimum requirements.

It is a further object of the present invention to provide an improved three large signal deflection yoke which can be constructed by modifying a standard two signal deflection yoke.

It is a further object of the present invention to provide a pair of deflection coils which are connected so that two large deflection signals can be added therein with little or no loss of linearity.

These and other objects of this invention will become apparent to those skilled in the art upon consideration of the accompanying specification, claims and drawings.

BRIEF DESCRIPTION OF THE DRAWINGS

Referring to the drawings, wherein like characters indicate like parts throughout the figures.

DESCRIPTION OF THE PREFERRED EMBODIMENT

Figure 1:
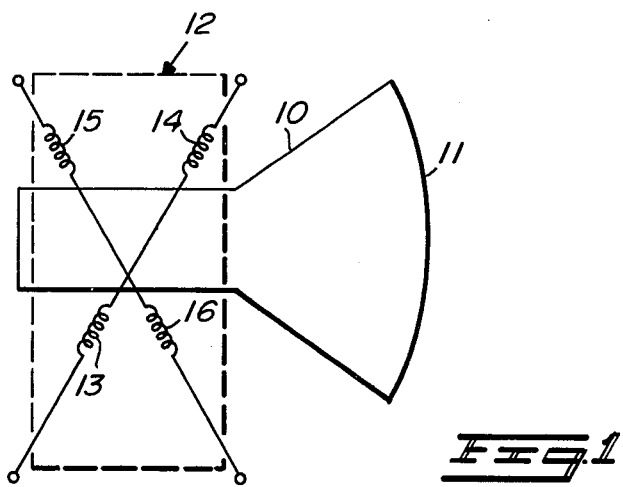
FIG. 1 is a schematic view of a cathode ray tube with a standard magnetic deflection yoke thereon.

In the figures, the numeral 10 designates a cathode ray tube having a face 11, which in this embodiment is approximately 9 inches as measured on the diagonal. The cathode ray tube 10 is a standard magnetic deflection type tube having a magnetic deflection yoke, generally designated 12, associated therewith. The yoke 12 includes a first pair of deflection coils 13 and 14 connected in series and adapted to receive a first deflection signal thereacross and a second pair of deflection coils 15 and 16 connected in series and adapted to have a second deflection signal applied thereacross. The yoke 12 in FIG. 1 is connected for the standard two signal deflection system wherein coils 13 and 14 receive a vertical deflection signal and coils 15 and 16 receive a horizontal deflection signal. In the present system, because of the differences in frequencies for the various deflection signals, the two coils 13 and 14, normally used for vertical deflection, are used for horizontal deflection and the two coils 15 and 16, normally used for horizontal deflection, are used for vertical deflection. While the present description is drawn specifically to modifying a standard yoke on a cathode ray tube, it should be understood that a new yoke constructed specifically for use in the present three large signal deflection system could be manufactured if desired.

Figure 2:
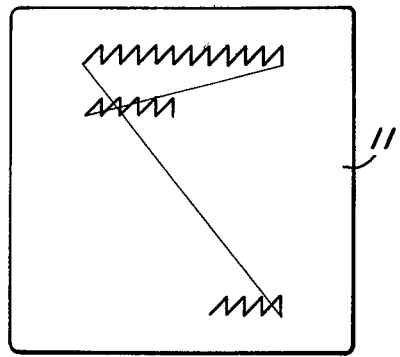
FIG. 2 is a view of the face of a cathode ray tube having the improved three large signal deflection system coupled thereto, illustrating the sweep caused by the three large deflection signals.

Referring specifically to FIG. 2, the face 11 of the cathode ray tube 10 is illustrated with a typical trace produced by the three large signal deflection system of the present invention. FIG. 2 illustrates a plurality of approximately equally spaced vertical traces each having a width or vertical dimension defined by the amplitude of the small vertical sawtooths. The horizontal deflection is produced by a horizontal sawtooth and the vertical deflection is produced by two deflection signals, one of which is a step function and the other of which is the vertical sawtooth. In the present embodiment the horizontal sawtooth has a frequency of approximately 264Hz and is applied to the series connected deflection coils 13 and 14 with no modification thereof. The horizontal deflection signal has an amplitude of approximately 8 volts at the inputs to the deflection coils 13 and 14. The vertical step deflection signal has a frequency of approximately 33Hz and the vertical sawtooth deflection signal has a frequency of approximately 140kHz. In the present embodiment there are approximately 8 lines or vertical traces per frame and each line or trace can illustrate characters therein having a size or vertical height of approximately 0.16 inches. It should of course be understood that the various frequencies, voltages and dimensions are unique to the embodiment illustrated and any desired variations therein might be devised by those skilled in the art. Further, the present embodiment is explained with two vertical traces and a standard horizontal trace, but it should be understood that these might be interchanged for other applications.

Figure 3:
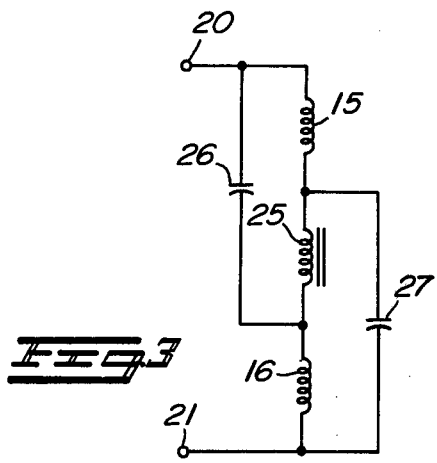
FIG. 3 is a schematic diagram of a deflection system embodying the present invention.

Referring specifically to FIG. 3, the modification of the yoke 12 is illustrated schematically. One end of the coil 15 is connected to an input terminal 20 for receiving a deflection signal thereon in a standard fashion. One end of the deflection coil 16 is connected to an input terminal 21 for receiving a deflection signal thereon in a standard fashion. The opposite ends of the coils 15 and 16 have an inductance, which in this embodiment is a choke 25, connected therebetween so that the coils 15 and 16 and the choke 25 are in series between the terminals 20 and 21. A first capacitor 26 is connected in parallel with the coil 15 and the choke 25. A second capacitor 27 is connected in parallel with the coil 16 and the choke 25.

Figure 4:
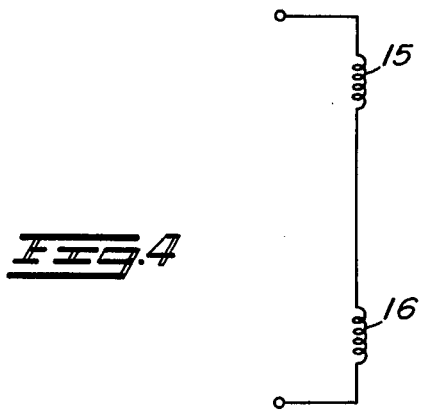
FIG. 4 is a schematic diagram of the electrical low frequency equivalent of FIG. 3.
Figure 5:
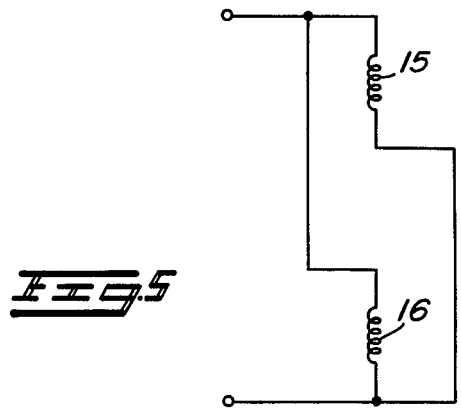
FIG. 5 is a schematic diagram of the electrical high frequency equivalent of the circuit of FIG. 3.

Choke 25 in combination with the capacitors 26 and 27 forms a type of low pass filter having a cutoff frequency somewhere between the frequency of the relatively high vertical sawtooth deflection signals and the relatively low vertical step deflection signals. The choke 25 passes the low frequency vertical step deflection signal so that the deflection coils 15 and 16 appear, electrically, to be connected in series for the vertical step deflection signal. The electrical equivalent of the circuit illustrated in FIG. 3 is illustrated in FIG. 4 for the vertical step deflection signal. The capacitors 26 and 27 pass the high frequency vertical sawtooth deflection signals so that the deflection coils 15 and 16 appear electrically to be connected in parallel for the high frequency vertical sawtooth deflection signal, as illustrated in FIG. 5. In the present embodiment the choke 25 has a value of approximately 100 microhenries and the capacitors 26 and 27 each have a value of approximately 1 microfarad. The vertical step deflection signal has an amplitude of approximately 5 volts at the input terminal to the yoke 12 and the vertical sawtooth deflection signal has an amplitude of approximately 11 volts at the input terminal to the yoke 12. At low deflection frequencies where large deflection current is required the deflection coils are connected in series and the same deflection coils are connected in parallel for high deflection frequencies where high deflection voltage is required. Therefore, a single relatively small current, low voltage power supply may be used. Thus, the present system is capable of receiving relatively large deflection signals and adding them while maintaining an impedance match between the deflection coils and the power supplies producing the deflection signals. It should of course be understood that many modifications and alternations to the circuitry illustrated in FIG. 3 may be devised by those skilled in the art but this is the preferred embodiment because of its simplicity and ease of application to existing standard yokes.

I claim:

1. In a deflection system for controlling the position of the electron beam on the face of a cathode ray tube including a relatively low frequency deflection signal for moving the beam in substantially equal steps across the face in a predetermined direction and a relatively high frequency deflection signal for moving the beam linearly in the predetermined direction a distance less than the distance between the equal steps, the improvement comprising:
   a. a pair of deflection coils;
   b. inductance means connected to one end of each of said deflection coils to provide a series circuit therethrough;
   c. first capacitance means connected in parallel with the series connected inductance means and one deflection coil;
   d. second capacitance means connected in parallel with the series connected inductance means and the other deflection coil; and
   e. means for applying the high and low frequency deflection signals across the series circuit.

2. The improvement in a deflection system as claimed in claim 1 wherein the inductance means includes a choke.

3. The improvement in a deflection system as claimed in claim 1 wherein the inductance means and first and second capacitance means form low pass filters with a cut-off frequency lying between the frequencies of the high and low frequency deflection signals so that electrically the deflection coils appear in series for the low frequency deflection signal and in parallel for the high frequency deflection signal.

4. The improvement in a deflection system as claimed in claim 1 wherein the predetermined direction is the vertical direction.

5. A deflection system for controlling the position of the electron beam on the face of a cathode ray tube comprising:
   a. a first pair of deflection coils connected in series and adapted for receiving thereacross a first deflection signal for moving the beam generally in a first direction;
   b. a second pair of deflection coils;
   c. an inductance interconnected to each of said second pair of deflection coils so as to form a series circuit therewith;
   d. first capacitance means connected in parallel with said inductance and one of said second pair of deflection coils;
   e. second capacitance means connected in parallel with said inductance and the other of said second pair of deflection coils; and
   f. said second pair of deflection coils and interconnected inductance and capacitance means being adapted for receiving thereacross second deflection signals for moving the beam in a second direction generally perpendicular to the first direction.

6. In a deflection system for controlling the position of the electron beam on the face of a cathode ray tube including a relatively low frequency deflection signal for moving the beam in substantially equal steps across the face in a predetermined direction and a relatively high frequency deflection signal for moving the beam linearly in the predetermined direction a distance less than the distance between the equal steps, the improvement comprising:
   a. a pair of deflection coils interconnected and adapted to receive the high and low frequency deflection signals thereacross; and
   b. inductance means electrically interposed between said deflection coils and capacitance means connected in parallel with said inductance and a respective one of said deflection coils so as to electrically connect said deflection coils in series for low frequency deflection signal operation and in parallel for high frequency deflection signal operation.

* * * * *